US008016150B1

(12) United States Patent
Bunch et al.

(10) Patent No.: US 8,016,150 B1
(45) Date of Patent: Sep. 13, 2011

(54) USED COOKING GREASE DISPOSAL AND STORAGE DEVICE

(76) Inventors: James H. Bunch, Carlsbad, CA (US); Danny R. Fitzpatrick, Carlsbad, CA (US)

( * ) Notice: Subject to any disclaimer, the term of this patent is extended or adjusted under 35 U.S.C. 154(b) by 508 days.

(21) Appl. No.: 12/174,417

(22) Filed: Jul. 16, 2008

Related U.S. Application Data

(60) Provisional application No. 60/951,061, filed on Jul. 20, 2007.

(51) Int. Cl.
B65D 21/02 (2006.01)
B65D 25/18 (2006.01)
A47J 27/60 (2006.01)

(52) U.S. Cl. ............ 220/571; 220/23.87; 220/495.06; 220/910; 99/446

(58) Field of Classification Search ............ 210/473, 210/477, 482; 220/560.03, 571, 574, 575, 220/908.3, 910, 23.87, 495.06; 99/444–446
See application file for complete search history.

(56) References Cited

U.S. PATENT DOCUMENTS

| 56,819 | A | * | 7/1866 | Smith | 248/101 |
| 192,348 | A | * | 6/1877 | Preston | 141/332 |
| 1,507,924 | A | * | 9/1924 | Mabry | 4/455 |
| 1,641,051 | A | * | 8/1927 | Rheney | 222/189.07 |
| 1,721,311 | A | * | 7/1929 | Muenchen | 215/12.1 |
| 1,948,771 | A | * | 2/1934 | Rucker | 210/244 |
| 2,069,048 | A | * | 1/1937 | Rehberger | 222/205 |
| 2,097,793 | A | * | 11/1937 | Howell | 99/446 |
| 2,100,888 | A | * | 11/1937 | Vine | 141/337 |
| 2,125,122 | A | * | 7/1938 | Mongiello | 220/825 |
| 2,247,040 | A | * | 6/1941 | Whitsett | 210/238 |
| 2,517,759 | A | * | 8/1950 | Bentzen | 141/340 |
| 2,827,931 | A | * | 3/1958 | Melvin | 141/331 |
| 2,843,281 | A | * | 7/1958 | Gallois | 215/11.1 |
| 2,868,246 | A | * | 1/1959 | Nelson | 141/286 |
| 3,184,100 | A | * | 5/1965 | Thomas | 220/495.08 |
| 3,321,103 | A | * | 5/1967 | Phillips | 141/314 |
| 3,335,769 | A | * | 8/1967 | Ilg | 141/340 |
| 3,413,820 | A | * | 12/1968 | Paquin | 62/371 |
| 3,577,908 | A | * | 5/1971 | Burg | 99/333 |
| 3,670,916 | A | * | 6/1972 | Alpert | 220/23.87 |
| 3,818,956 | A | * | 6/1974 | Chamberlain | 141/316 |
| 4,022,257 | A | * | 5/1977 | O'Connell | 141/98 |
| 4,031,032 | A | * | 6/1977 | Jablecki | 210/474 |
| 4,099,654 | A | * | 7/1978 | Antolino | 222/184 |
| 4,114,660 | A | * | 9/1978 | Arruda | 141/98 |
| 4,133,356 | A | * | 1/1979 | Dillingham | 141/316 |
| 4,427,110 | A | * | 1/1984 | Shaw, Jr. | 206/205 |

(Continued)

FOREIGN PATENT DOCUMENTS

JP 07265610 A * 10/1995

*Primary Examiner* — J. Gregory Pickett
*Assistant Examiner* — Ned A Walker
(74) *Attorney, Agent, or Firm* — Neustel Law Offices

(57) ABSTRACT

A grease disposal and storage system for the efficient and safe disposal of hot grease and unhealthy fats from food items. The grease disposal and storage system generally includes a container including a cavity, wherein the cavity is defined within the container. A receptacle is positioned within the cavity of the container. A support is positioned within the cavity, wherein the support is positioned near an opening of the receptacle. A funnel is positioned within the cavity, wherein the funnel is stabilized by the support. The funnel is aligned with the opening of the receptacle so as to guide a disposable substance through the funnel and into the receptacle.

9 Claims, 6 Drawing Sheets

U.S. PATENT DOCUMENTS

| | | | | |
|---|---|---|---|---|
| 4,485,855 A * | 12/1984 | Dillingham | | 141/316 |
| 4,592,163 A * | 6/1986 | Wilson | | 43/122 |
| 4,604,203 A * | 8/1986 | Kyle | | 210/489 |
| 4,640,185 A * | 2/1987 | Joyner | | 99/495 |
| 4,688,395 A * | 8/1987 | Holcomb | | 62/294 |
| 4,823,974 A * | 4/1989 | Crosser | | 62/457.3 |
| 4,834,261 A * | 5/1989 | Brdlik | | 141/332 |
| 4,909,137 A * | 3/1990 | Brugnoli | | 99/444 |
| 4,926,584 A * | 5/1990 | Horibata | | 47/59 R |
| 4,928,848 A * | 5/1990 | Ballway | | 220/23.87 |
| 4,974,393 A * | 12/1990 | Rich et al. | | 53/433 |
| 5,018,559 A * | 5/1991 | Branan | | 141/339 |
| 5,033,256 A * | 7/1991 | Rupp | | 53/570 |
| 5,044,266 A * | 9/1991 | Geogaris | | 99/446 |
| 5,048,778 A * | 9/1991 | Wright | | 248/98 |
| 5,099,998 A * | 3/1992 | Curzon et al. | | 206/514 |
| 5,112,628 A * | 5/1992 | Conrad | | 426/117 |
| 5,176,067 A * | 1/1993 | Higgins | | 99/340 |
| 5,219,006 A * | 6/1993 | Bishop | | 141/1 |
| 5,276,307 A * | 1/1994 | Higgins | | 219/386 |
| 5,282,541 A * | 2/1994 | Chen | | 215/229 |
| 5,297,476 A * | 3/1994 | Garland et al. | | 99/495 |
| 5,313,877 A * | 5/1994 | Holland | | 99/446 |
| 5,353,964 A * | 10/1994 | Liu et al. | | 222/134 |
| 5,381,839 A * | 1/1995 | Dowd | | 141/242 |
| 5,424,040 A * | 6/1995 | Bjornsson | | 422/101 |
| 5,477,897 A * | 12/1995 | Scofield | | 141/105 |
| 5,526,737 A * | 6/1996 | Betzen | | 99/495 |
| 5,526,961 A * | 6/1996 | Burrows | | 222/185.1 |
| 5,532,168 A * | 7/1996 | Marantz | | 436/176 |
| 5,542,922 A * | 8/1996 | Petterson et al. | | 604/77 |
| 5,649,477 A * | 7/1997 | Lingwood | | 99/446 |
| 5,655,384 A * | 8/1997 | Joslin, Jr. | | 62/294 |
| 5,713,265 A * | 2/1998 | Strader et al. | | 99/446 |
| D394,989 S * | 6/1998 | Block | | D7/700 |
| 5,934,099 A * | 8/1999 | Cook et al. | | 62/457.2 |
| 5,945,075 A * | 8/1999 | Chiron et al. | | 422/300 |
| 5,950,689 A * | 9/1999 | Varlet | | 141/22 |
| 5,971,194 A * | 10/1999 | Freedland | | 220/495.08 |
| 5,979,516 A * | 11/1999 | Grant | | 141/331 |
| 6,010,034 A * | 1/2000 | Walthers | | 222/135 |
| 6,044,650 A * | 4/2000 | Cook et al. | | 62/130 |
| 6,082,574 A * | 7/2000 | Johnson | | 220/495.1 |
| 6,113,257 A * | 9/2000 | Sharon et al. | | 366/130 |
| D442,834 S * | 5/2001 | Perez | | D7/628 |
| 6,295,820 B1* | 10/2001 | Cauchy et al. | | 62/3.6 |
| 6,321,662 B1* | 11/2001 | Fraise | | 108/25 |
| 6,355,168 B1* | 3/2002 | White | | 210/236 |
| 6,378,325 B1* | 4/2002 | Yang | | 62/457.6 |
| 6,446,827 B1* | 9/2002 | Akins | | 220/570 |
| 6,554,810 B1* | 4/2003 | Wilk et al. | | 604/323 |
| D478,785 S * | 8/2003 | Rorke et al. | | D7/628 |
| 6,616,319 B2* | 9/2003 | Renz | | 366/130 |
| 6,719,194 B2* | 4/2004 | Richards | | 232/43.1 |
| D493,070 S * | 7/2004 | Worthy | | D7/600 |
| 6,799,433 B1* | 10/2004 | Gleason et al. | | 62/457.9 |
| 6,899,850 B2* | 5/2005 | Haywood et al. | | 422/102 |
| 6,962,106 B2* | 11/2005 | Viraldo | | 99/339 |
| 7,036,975 B2* | 5/2006 | Renz | | 366/130 |
| 7,137,419 B1* | 11/2006 | Reeves | | 141/340 |
| 7,147,826 B2* | 12/2006 | Haywood et al. | | 422/102 |
| 7,252,121 B2* | 8/2007 | Hillis | | 141/98 |
| 7,258,711 B2* | 8/2007 | Dunn et al. | | 55/385.1 |
| 7,308,796 B1* | 12/2007 | Eager | | 62/3.2 |
| 7,350,663 B2* | 4/2008 | Chomik et al. | | 220/264 |
| 7,377,210 B1* | 5/2008 | Franco | | 99/446 |
| 7,428,864 B2* | 9/2008 | Wengrovsky | | 99/646 C |
| 7,487,881 B2* | 2/2009 | Watzke et al. | | 220/501 |
| 7,713,686 B2* | 5/2010 | Poo et al. | | 435/1.2 |
| 7,731,846 B1* | 6/2010 | Jones | | 210/257.2 |
| 2003/0029867 A1* | 2/2003 | Vicknair | | 220/23.87 |
| 2003/0106609 A1* | 6/2003 | Leoncavallo | | 141/340 |
| 2004/0123857 A1* | 7/2004 | Viraldo | | 126/9 R |
| 2004/0231228 A1* | 11/2004 | Pazik et al. | | 43/107 |
| 2005/0044819 A1* | 3/2005 | Chomik et al. | | 53/459 |
| 2006/0237091 A1* | 10/2006 | Hillis | | 141/98 |

* cited by examiner

USED COOKING GREASE DISPOSAL AND STORAGE DEVICE

CROSS REFERENCE TO RELATED APPLICATIONS

I hereby claim benefit under Title 35, United States Code, Section 119(e) of U.S. provisional patent application Ser. No. 60/951,061 filed Jul. 20, 2007. The 60/951,061 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to grease disposal systems and more specifically it relates to a grease disposal and storage system for the efficient and safe disposal of hot grease and unhealthy fats from food items.

2. Description of the Related Art

Any discussion of the related art throughout the specification should in no way be considered as an admission that such related art is widely known or forms part of common general knowledge in the field.

Products for storing cooking grease have been in use for years. Typically, the products include various types of containers in which the grease is dumped into after cooking various types of food items, such as ground beef, chicken, sausage, bacon, and fried vegetables. The container usually does not include a safe way of straining the grease from the food items and it can be difficult to separate the grease from the food item.

Separation tactics that have been used in the past include attempting to hold the food item within the pad with a spatula or lid while tilting the pan to pour out the hot grease within the container, scooping the grease from the pan with a spoon, soaking the grease up from the pan with a napkin and waiting for the grease to harden and then scooping the hardened substance away from the pan. However, none of these tactics provide an easy and safe manner in which to separate the grease from the food item. Because of the inherent problems with the related art, there is a need for a new and improved grease disposal and storage system for the efficient and safe disposal of hot grease and unhealthy fats from food items.

BRIEF SUMMARY OF THE INVENTION

The general purpose of the present invention is to provide a grease disposal and storage system that has many of the advantages of the grease disposal systems mentioned heretofore. The invention generally relates to a grease disposal system which includes a container including a cavity, wherein the cavity is defined within the container. A receptacle is positioned within the cavity of the container. A support is positioned within the cavity, wherein the support is positioned near an opening of the receptacle. A funnel is positioned within the cavity, wherein the funnel is stabilized by the support. The funnel is aligned with the opening of the receptacle so as to guide a disposable substance through the funnel and into the receptacle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a grease disposal and storage system for the efficient and safe disposal of hot grease and unhealthy fats from food items.

Another object is to provide a grease disposal and storage system that separates the grease from the food item.

An additional object is to provide a grease disposal and storage system that prevents the grease from spilling while separating from the food item.

A further object is to provide a grease disposal and storage system that stores the grease in an odor free sealed container.

Another object is to provide a grease disposal and storage system that may be easily cleaned.

Another object is to provide a grease disposal and storage system that may be formed in the shape of a decorative object.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
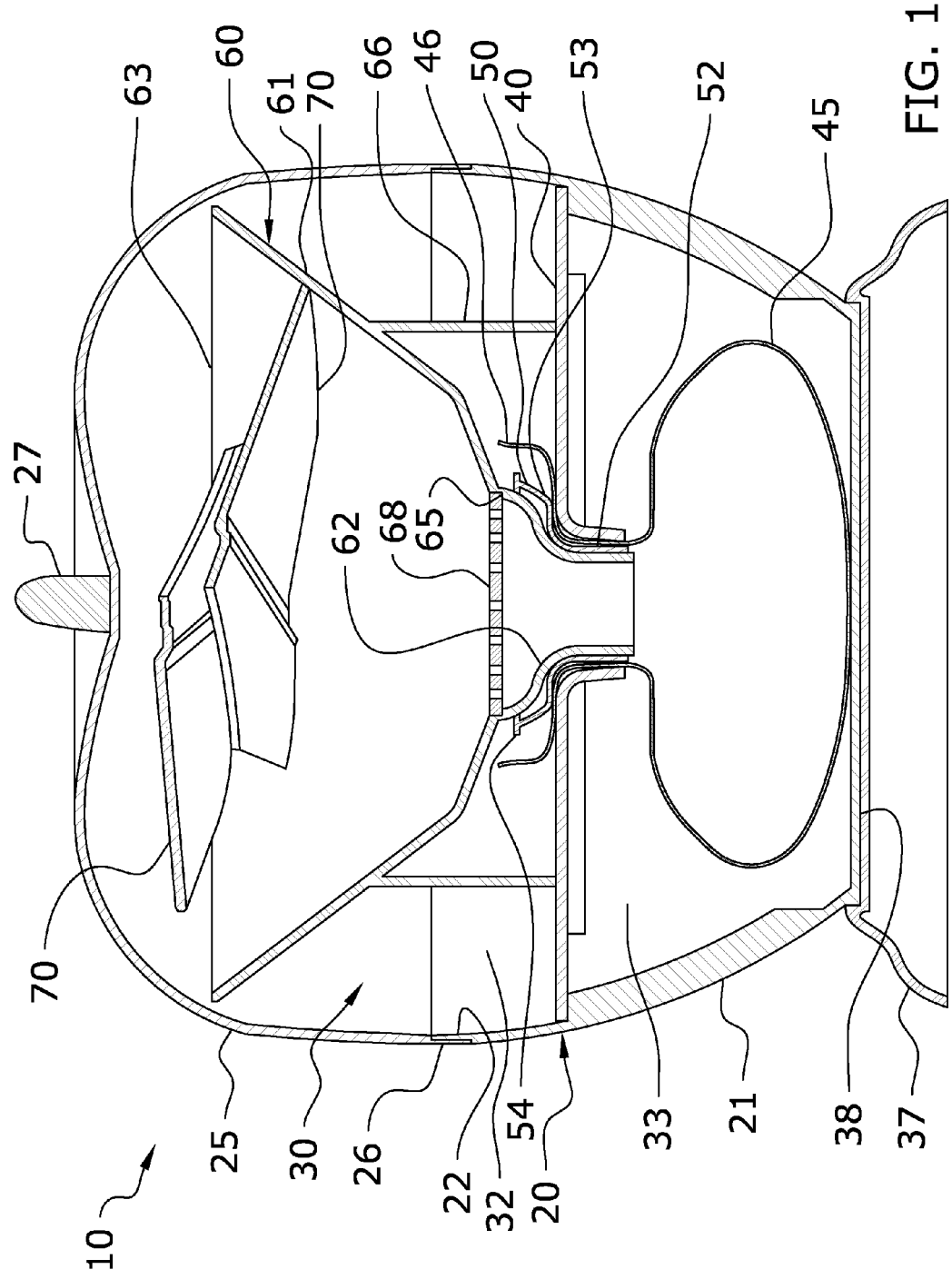
FIG. 1 is a sectional view of the present invention.
Figure 2:
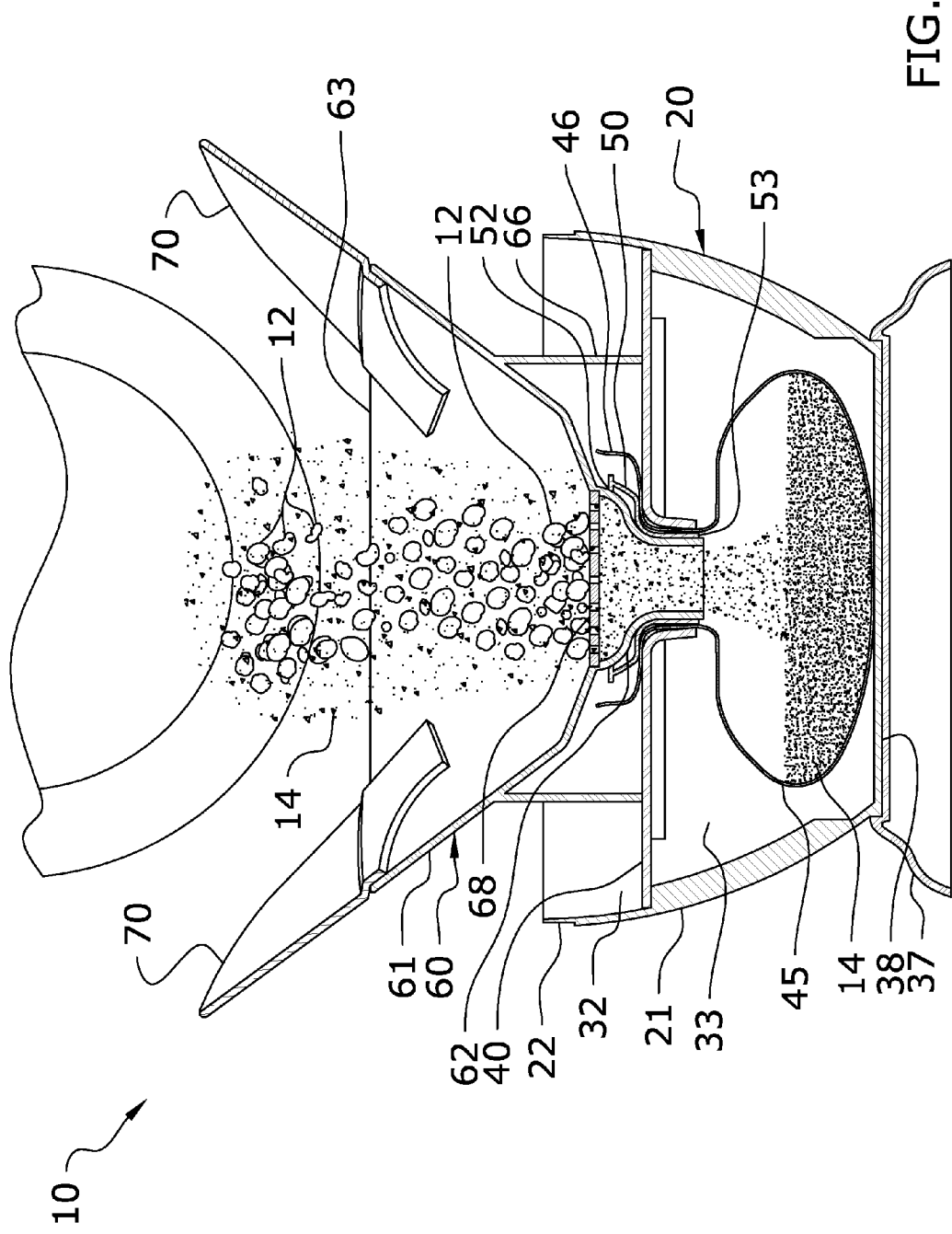
FIG. 2 is a sectional view of the present invention in use.
Figure 3:
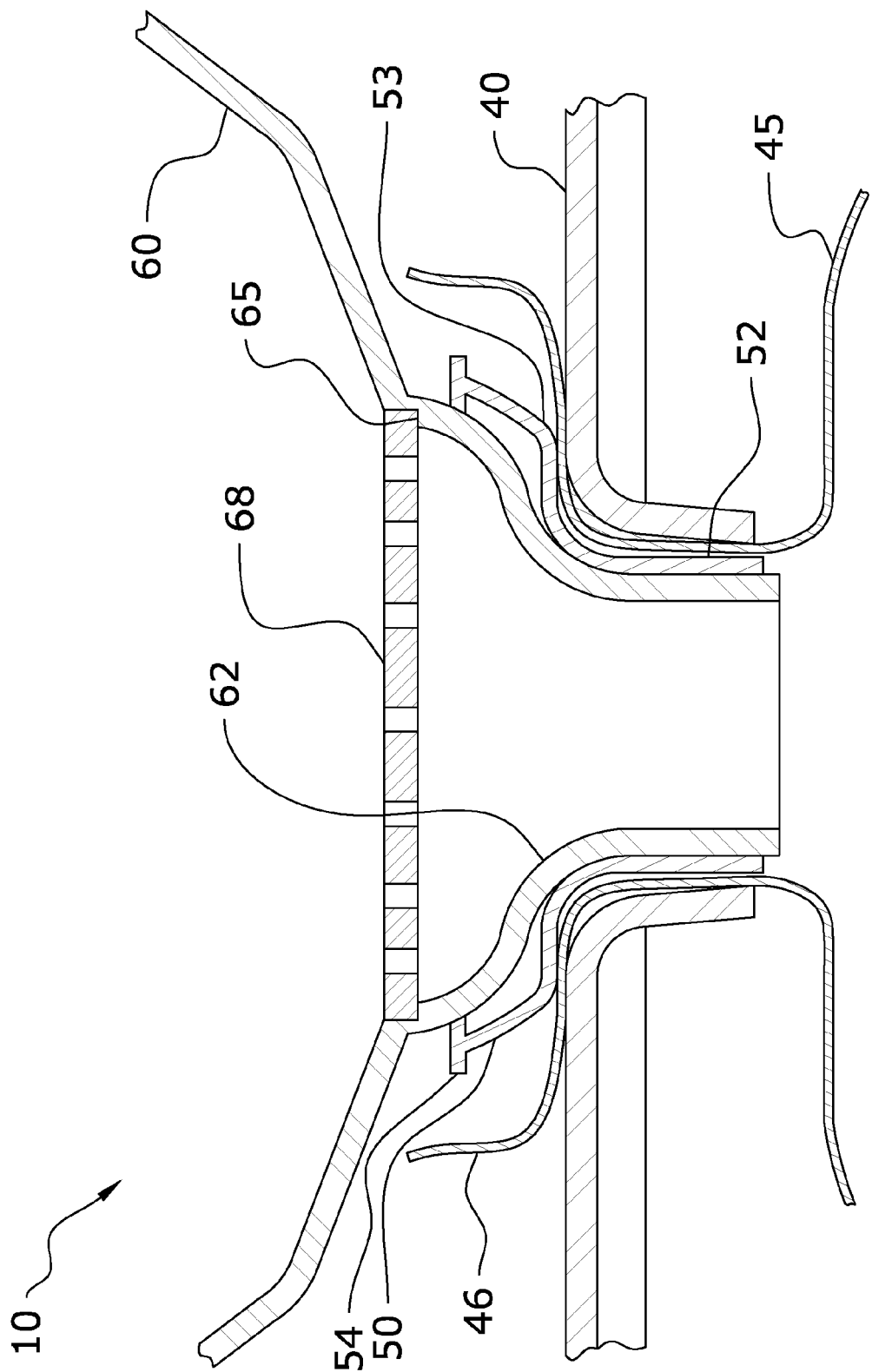
FIG. 3 is a magnified sectional view of the point where the funnel meets the opening of the receptacle.
Figure 4:
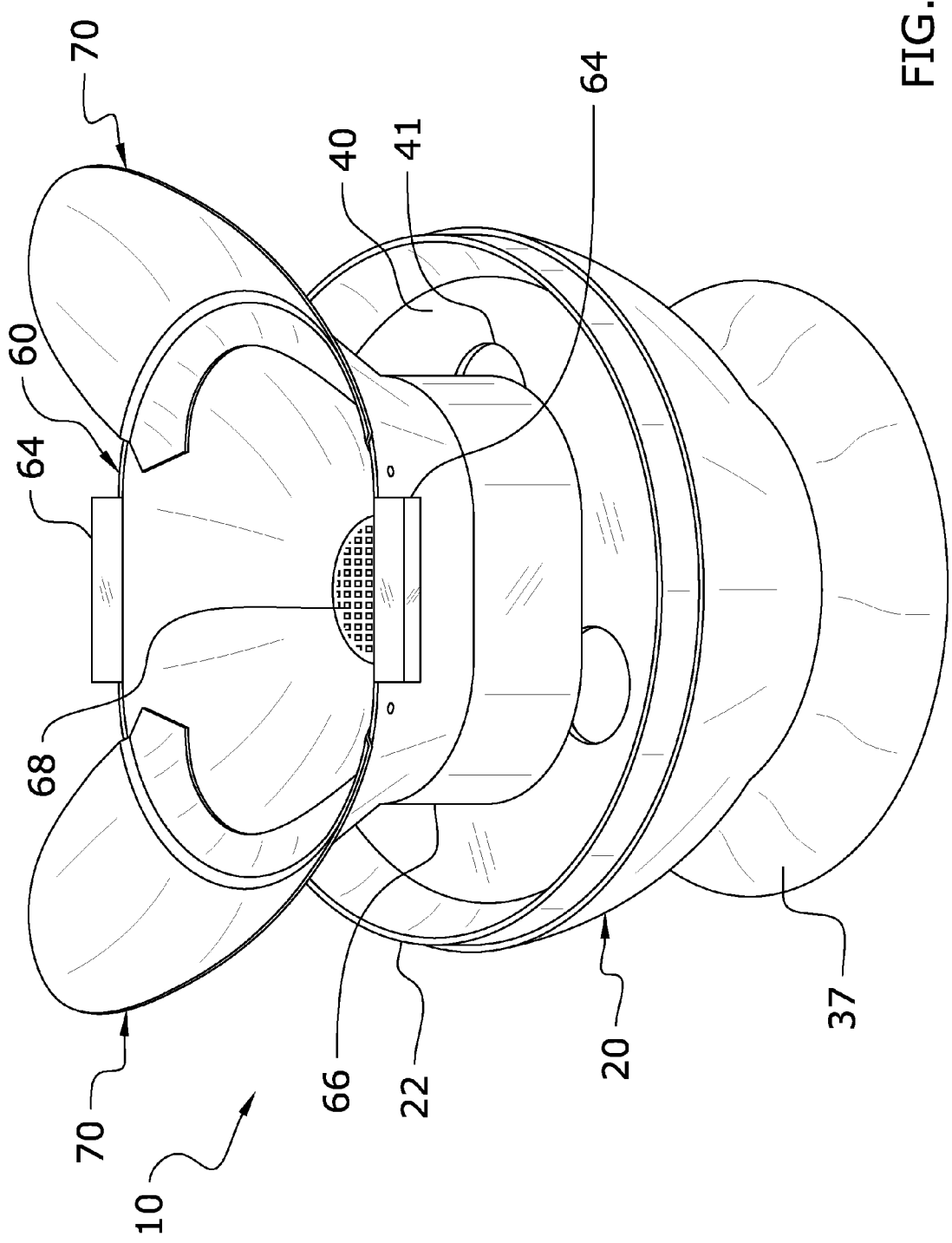
FIG. 4 is an upper perspective view of the present invention with the upper section removed and the extension flaps pivoted outwards.
Figure 5:
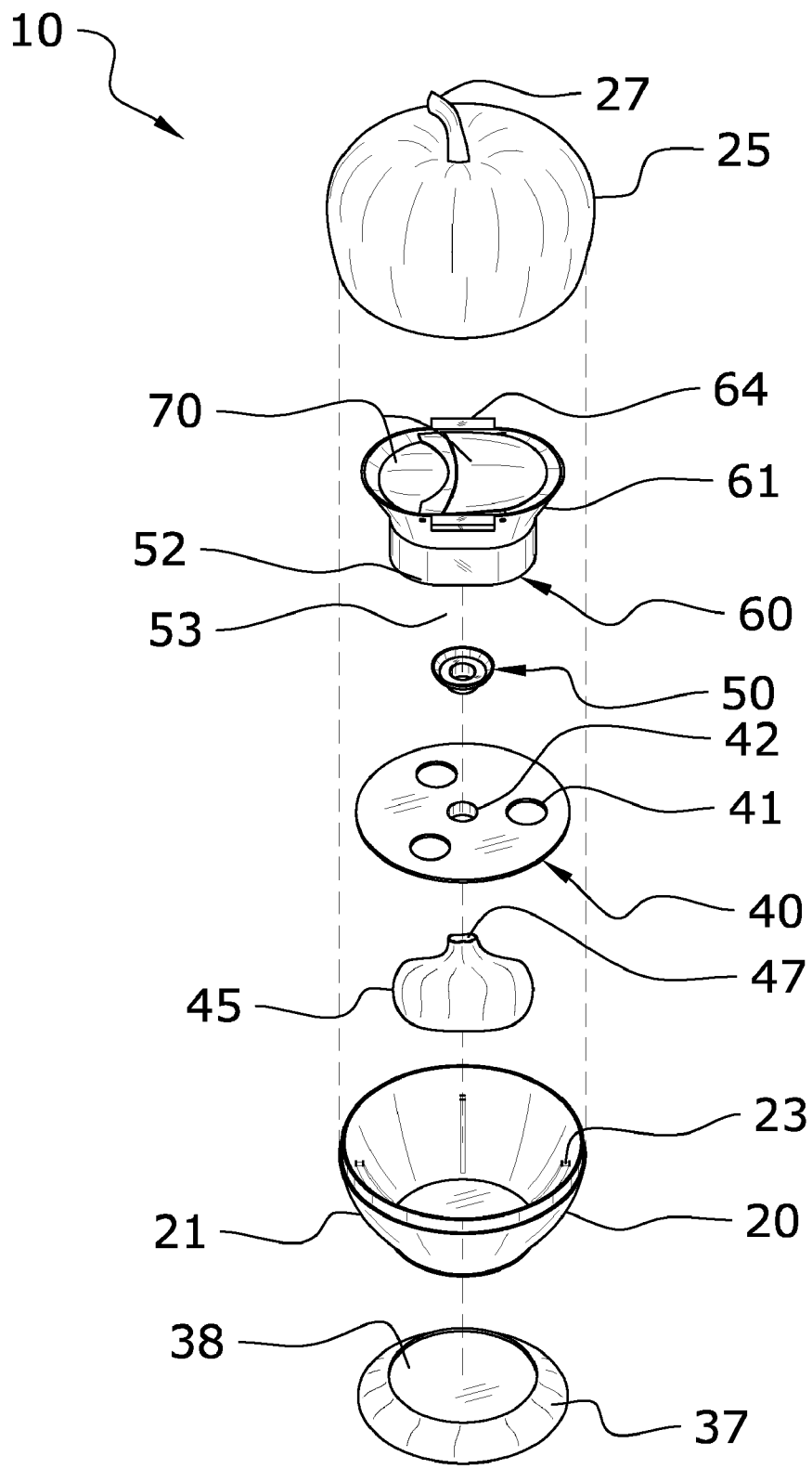
FIG. 5 is an exploded upper perspective view of the present invention.
Figure 6:
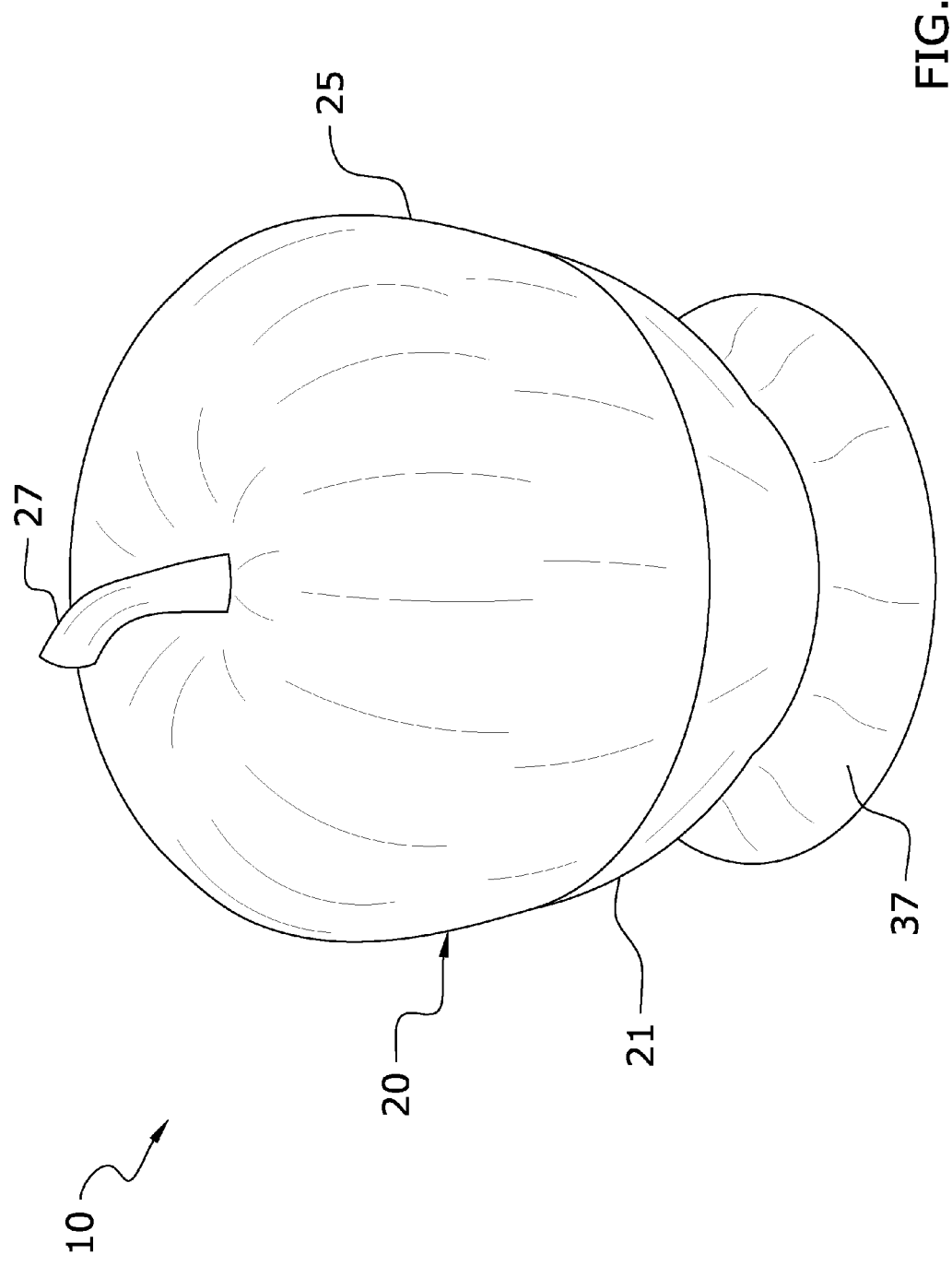
FIG. 6 is an upper perspective view of the present invention.

Turning now descriptively to the drawings, in which similar reference characters denote similar elements throughout the several views, FIGS. 1 through 6 illustrate a grease disposal and storage system 10, which comprises a container 20 including a cavity 30, wherein the cavity 30 is defined within the container 20. A receptacle 45 is positioned within the cavity 30 of the container 20. A support 40 is positioned within the cavity 30, wherein the support 40 is positioned near an opening 47 of the receptacle 45. A funnel 60 is positioned within the cavity 30, wherein the funnel 60 is stabilized by the support 40. The funnel 60 is aligned with the opening 47 of the receptacle 45 so as to guide a disposable substance 14 through the funnel 60 and into the receptacle 45.

B. Container

The container 20 is used to store the receptacle 45, funnel 60 and other components of the present invention enclosed within the container 20. The container 20 is preferably comprised of a hard plastic material that will maintain its shape around the inner components within the container 20 during storage and during use of the present invention. The container 20 is also temperature resistant so as to withstand the hot disposable substance 14 (e.g. cooking grease, fats, etc.). It is appreciated that the disposable substance 14 may be saved for future use (e.g. for cooking) if desired. The container 20 and all of the inner components stored within the container 20 are preferably dishwasher safe so as to be easily cleaned.

The container 20 includes a lower section 21 and an upper section 25 which are removable and attachable with respect to one another. The lower section 21 serves to hold and stabilize the inner components stored within the container 20. The upper section 25 serves as a cover to extend around the upper part of the inner components stored within the container 20. The lower section 21 and the upper section 25 preferably attach to one another when not currently utilizing the present invention via a first connecting portion 22 and a second connecting portion 26 of the lower section 21 and upper section 25 respectively. The first connecting portion 22 and the second connecting portion 26 may lock together in various manners, such as a twist lock structure, threadably attach or snap fit.

The container 20 may be comprised of various colors, shapes and sizes all which preferably enhance the overall appearance of the container 20. Some possible configurations of the container 20 include a configuration resembling a fruit such as an apple, pear, peach, orange, watermelon, pumpkin; a configuration resembling a vegetable such as a yellow pepper, a green pepper, a red pepper; a configuration resembling a various other objects or animals such as a cookie jar, a pig, a cow; or a configurations resembling various shapes, such as a square, circle, octagonal, or any other configuration which includes a lower section 21 and an upper section 25 removably attached.

The lower section 21 includes an inner support 23 to stabilize the support 40. The inner support 23 is preferably comprised of an inner ring surrounding the inner surface of the lower section 21. The container 20 also preferably includes at least one handle 27. In the preferred embodiment, the handle 27 extends from the upper section 25 and is comprised of the stem of the apple, wherein the container 20 is comprised of an apple configuration.

The lower section 21 and the upper section 25 are each hollow and define an inner cavity 30 extending within. The cavity 30 includes a lower portion 32 and an upper portion 33. The lower portion 32 and the upper portion 33 are defined by the support 40. The lower portion 32 contains the receptacle 45 and is defined within the lower part of the lower section 21 of the container 20. The upper portion 33 contains a majority of the funnel 60 and is defined within the upper section 25 and a portion of the lower section 21.

The container 20 is also preferably self supporting, wherein the container 20 includes a base unit 37 to stabilize the container 20 about a countertop or various other storage places. The base unit 37 preferably is removable from the container 20 and includes a recessed portion 38 to receive the lower end of the container 20. The base unit 37 stabilizes the container 20 to keep the container 20 from being knocked over and thus reduce the likelihood of spillage of the disposable substance 14.

C. Support

The support 40 is comprised of a configuration to fit within the cavity 30 of the lower section 21 and rest upon the inner support 23 of the lower section 21. The support 40 is preferably comprised of a plate configuration. The support 40 in the preferred embodiment is comprised of a round configuration; however other shapes may be appreciated. The support 40 is preferably comprised of a clear transparent configuration so as to view the contents of the receptacle 45 beneath the support 40. The support 40 is also preferably comprised of a durable and high temperature resistant material to withstand the weight of the funnel 60 and properly secure the flanges 46 of the receptacle 45 in an upright and open position, such as but not limited to plastic, metal or steel.

The support 40 preferably includes a plurality of outer openings 41 which serve as finger holes to grasp the support 40 when removing the support 40 from the container 20 and inserting the support 40 within the container 20. The outer openings 41 are spaced along the perimeter or near the perimeter of the support 40. The support 40 also includes a central opening 42 for receiving the outer flanges 46 of the receptacle 45 so the disposable substance 14 may be deposited within the receptacle 45 through the central opening 42. The support 40 may be comprised of various configurations so as to support 40 the funnel 60 and/or the opening 47 of the receptacle 45 so the disposable substance 14 is properly guided into the receptacle 45. The central opening 42 preferably includes a rounded corner adjacent the top side of the support 40 so when the outer flanges 46 of the receptacle 45 extend up onto the top side of the support 40 from the central opening 42, the outer flanges 46 are not ripped or tore upon the corner between the central opening 42 and the top side of the support 40. It is appreciated that the support 40 may include various lock and release systems (not shown) to securely attach the receptacle 45 or flanges of the receptacle 45 around the central opening 42.

The support 40 also may include various embossed or raised warnings around the perimeter of the support 40 or other easily viewable locations. The warnings may include phrases such as "Check Before Each Use" to alert the user to check the level of the disposable substance 14 within the receptacle 45 to prevent overfilling the receptacle 45 and "Let Grease Cool Down Before Disposal, Receptacle May Be Hot And Cause Injury". It is appreciated that various other warnings may be used to ensure proper usage of the present invention.

D. Receptacle

The disposable receptacle 45 is positioned within the lower portion 32 of the cavity 30 of the container 20. The receptacle 45 receives and stores the disposable substance 14. The receptacle 45 is preferably comprised of a high temperature resistant and clear material. The receptacle 45 may be comprised of a disposable and possibly biodegradable bag configuration.

The receptacle 45 may also be comprised of various other configurations, such as but not limited to configurations resembling a measuring cup, coffee cup, mug or glass.

The receptacle 45 preferably includes outer flanges 46 to extend through the central opening 42 of the support 40 and rest upon the top side of the support 40 to maintain the receptacle 45 in an open position to receive the disposable substance 14 and also ensure guidance of the disposable substance 14 within the receptacle 45 to prevent spillage. The outer flanges 46 are also preferably flexible and long enough to allow the outer flanges 46 to be secured about one another (e.g. tied) when removing the receptacle 45 to prevent spillage of the disposable substance 14. It is appreciated that an outer receptacle (not shown) may also be used to keep the storage receptacle 45 from moving about and to increase the strength of the storage receptacle 45, such as placing a bag (i.e. inner receptacle 45) within a coffee mug (i.e. outer receptacle).

E. Wedge

The wedge 50 is used to secure the receptacle 45 in an open position by securing the outer flanges 46 around the central opening 42. The wedge 50 is comprised of a cylindrical or funnel shaped configuration to fit within the central opening 42 and sandwich the outer flanges 46 between the wedge 50 and the perimeter of the central opening 42. The wedge 50 may be comprised of various types of high temperature resistant and durable materials.

The wedge 50 preferably includes a first securing portion 52 to extend within the central opening 42, a second securing portion 53 to extend up and over around the corner of the central opening 42 towards the top side of the support 40 and the handle portion 54 to angularly extend upwards from the support 40. The first securing portion 52 and the second securing portion 53 secure the outer flanges 46 about the central opening 42 and the handle portion 54 is used so as to be able to grasp the wedge 50 when removing the wedge 50 from the central opening 42.

The wedge 50 or outer flanges 46 may also be spring loaded to ensure a complete seal when funnel 60 is removed for cleaning or other reasons. The spring (not shown) would allow the flange to be opened when the funnel 60 is inserted and then close the outer flange 46 or seal the opening leading to the receptacle 45 when the funnel 60 is removed to prevent odor leakage and spillage of the disposable substance 14.

F. Funnel

A funnel 60 is positionable within the cavity 30 and is used to direct the disposable substance 14 within the receptacle 45. The body 61 of the funnel 60 extends vastly within the upper portion 33 of the cavity 30 and preferably includes a large enough mouth 63 to receive the disposable substance 14 and any food items 12. The spout 62 extends within the central opening 42 upon an inner side of the wedge 50 and may be removed from the central opening 42 as desired. The funnel 60 may also include multiple handles 64 positioned adjacent the mouth 63 upon the body 61 for easy removal of the funnel 60 from within the cavity 30 of the container 20. The funnel 60 is comprised of various high temperature resistant materials, such as metal, steel or ABS plastic. The funnel 60 may also include various locking mechanisms to lock into place so that the spout 62 aligns with the opening of the receptacle 45.

The funnel 60 further preferably includes at least one outer support 66 to stabilize the body 61 of the funnel 60 about the support 40 or the inner surface of the container 20. The outer support 66 may be comprised of a ring configuration and extend downwardly from the body 61 of the funnel 60 to the top side of the support 40. The outer support 66 may also be used to steady the funnel 60 and prevent the spout 62 from extending too far within the receptacle 45 so as to puncture the receptacle 45.

The funnel 60 also includes an inner support 65 (e.g. notches, inner ring) upon an inside surface of the funnel 60 near the spout 62. The inner support 65 stabilizes the strainer 68, wherein a removable strainer 68 may be positioned within the funnel 60 to catch any food items 12 or other items not desired to be deposited within the receptacle 45.

The funnel 60 may further include extension flaps 70 extending from the body 61 of the funnel 60 near the mouth 63 (upper end). The extension flaps 70 serve to increase the surface area of the mouth 63 of the funnel 60 so as to more easily pour the food items 12 and the disposable substance 14 within the funnel 60. The extension flaps 70 are preferably pivotally connected to the funnel 60 so as to fold inwards when placing the upper section 25 back over the funnel 60 during storage of the present invention.

G. Operation of Preferred Embodiment

In use, the upper section 25 of the container 20 is removed from the lower section 21 and set aside. The user then confirms that the receptacle 45 is attached about the support 40 and has sufficient room for additional disposable substance 14 within. The user then places the funnel 60 on the support 40 so that the spout 62 of the funnel 60 penetrates the central opening 42 and is aligned with the opening 47 of the receptacle 45.

The contents of the meal (i.e. food item 12 and disposable substance 14) are then deposited into the funnel 60 to allow the disposable substance 14 to run through the strainer 68 and into the receptacle 45 through the central opening 42. Once the disposable substance 14 has drained from the food item 12 (e.g. hamburger, chicken, etc.), the handles 64 of the funnel 60 may be grasped and the funnel 60 removed from the container 20. At this time the outer flanges 46 preferably automatically close (i.e. via spring mechanism) thus sealing the receptacle 45 so no disposable substance 14 is able to leak out.

The user then pours the food item 12 (from the funnel 60) back into its desired location. A desired location may include the pan, wherein the user may then add additional spices or pasta sauce to the food item 12 and finish preparing the food item 12 for the meal. The funnel 60 may then be cleaned and replaced back within the cavity 30 of the container 20. The upper section 25 may now be secured back onto the lower section 21 and the container 20 stored for future use. It is appreciated that if the receptacle 45 is full, the receptacle 45 may be removed and the disposable substance 14 disposed of and a new receptacle 45 or the cleaned receptacle 45 may be replaced back within the container 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A grease disposal and storage system, comprising:
   a container including a lower section, an upper section and a cavity defined within said lower section and said upper section;
   wherein said lower section is removably attached to said upper section;
   a support plate having a central opening and positioned within said cavity to define a lower portion and an upper portion of said cavity, wherein said lower portion is defined within said lower section below said support plate and wherein said upper portion is substantially defined within said upper section above said support plate;
   a disposable bag receptacle having a containment area and an outer flange, wherein said containment area is positioned within said lower portion of said cavity below said support plate and wherein said outer flange extends through said central opening of said support plate to within said upper portion of said cavity;
   a cylindrical wedge having a first securing portion and a second securing portion, wherein said cylindrical wedge is positioned along an interior of said outer flange of said disposable bag receptacle and wherein said first securing portion vertically extends within said central opening of said support plate and wherein said second securing portion horizontally extends along a top of said support plate so sandwich said outer flange between said cylindrical wedge and said support plate; and
   a funnel having a body and a spout, wherein said body extends within said upper portion of said cavity and wherein said spout extends within said central opening leading to said lower portion of said cavity such that said funnel is stabilized by said support plate;
   wherein said spout of said funnel is positioned along an interior of said cylindrical wedge to sandwich said cylindrical wedge between said funnel and said disposable bag receptacle such that said spout aligns with an opening of said disposable bag receptacle to guide a disposable substance through said funnel and within said disposable bag receptacle.

2. The grease disposal and storage system of claim 1, including a strainer positioned within said funnel to prevent a food item from falling within said receptacle.

3. The grease disposal and storage system of claim 1, wherein said central opening of said support plate has a curved upper edge.

4. The grease disposal and storage system of claim 1, wherein said support plate has a plurality of outer openings spaced along a perimeter of said support plate to facilitate removal of said support plate.

5. The grease disposal and storage system of claim 1, wherein said container is comprised of a decorative object.

6. The grease disposal and storage system of claim 5, wherein said container is comprised of an apple shaped configuration.

7. The grease disposal and storage system of claim 1, wherein said funnel includes at least one extension flap to increase a surface area of a mouth of said funnel.

8. The grease disposal and storage system of claim 7, wherein said at least one extension flap is pivotally connected to said body of said funnel and wherein said at least one extension flap extends from an upper end of said body of said funnel.

9. A grease disposal and storage system, comprising:
   a container including a lower section, an upper section and a cavity defined within said lower section and said upper section;
   wherein said lower section is removably attached to said upper section;
   a support plate positioned within said cavity to define a lower portion and an upper portion of said cavity, wherein said lower portion is defined within said lower section and wherein said upper portion is substantially defined within said upper section;
   wherein said support plate includes a central opening;
   a receptacle positioned within said lower portion of said cavity, wherein said receptacle includes an outer flange to extend through said central opening of said support so that said receptacle is maintained in an open position;
   a wedge securing said outer flange about said central opening by sandwiching said outer flange between said support plate and said wedge to maintain said receptacle in said open position;
   a funnel extending within said upper portion of said cavity, wherein said funnel is supported by said support and wherein a spout of said funnel aligns with said central opening of said support to guide a disposable substance through said funnel and within said receptacle;
   a strainer positioned within said funnel to prevent a food item from falling through said central opening within said receptacle with said disposable substance; and
   at least one extension flap pivotally connected to said funnel, wherein said at least one extension flap increases a surface area of said mouth of said funnel.

* * * * *